March 2, 1943.   J. MAGA   2,312,569
LAWN EDGER
Filed Feb. 4, 1942

INVENTOR.
Joe Maga
BY Carlos G. Stratton
ATTORNEY.

Patented Mar. 2, 1943

2,312,569

UNITED STATES PATENT OFFICE 2,312,569

LAWN EDGER

Joe Maga, Los Angeles, Calif.

Application February 4, 1942, Serial No. 429,529

10 Claims. (Cl. 97—227)

My invention relates to a lawn edger and has for its principal object to provide a device of that character which will cut the lawn away from side-walks, driveways and the like to the distance desired by the operator.

Other important objects of the invention are to provide a lawn edger that is positive in operation, convenient in use, of improved structure, easily installed in a working position and easily disconnected therefrom, economical of manufacture, relatively simple, generally superior and serviceable.

The invention also comprises novel details of construction and novel combinations and arrangements of parts, which will more fully appear in the course of the following description. However, the drawing merely shows and the following description merely describes one embodiment of the present invention, which is given by way of illustration or example only.

In the drawing, like reference characters designate similar parts in the several views.

Figure 1:
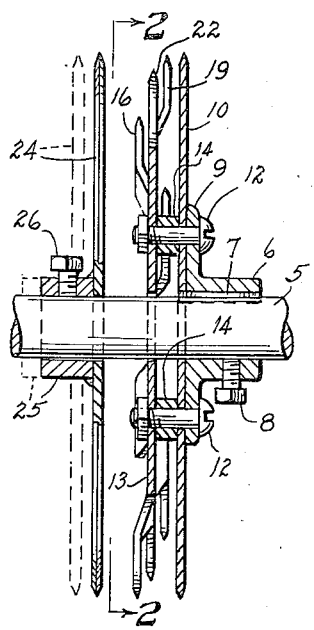
Figure 1 is a vertical section of an embodiment of the foregoing objects, taken on the line 1—1 of Figure 2.
Figure 2:
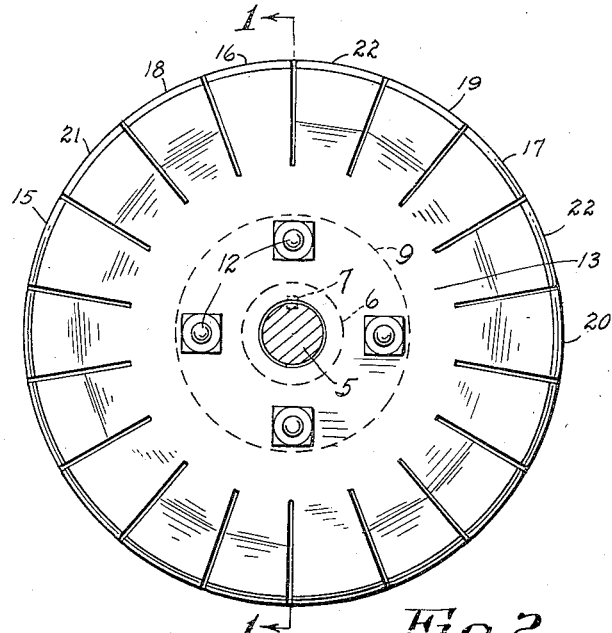
Figure 2 is a section taken along the line 2—2 of Figure 1, looking in the direction of the arrows.
Figure 3:
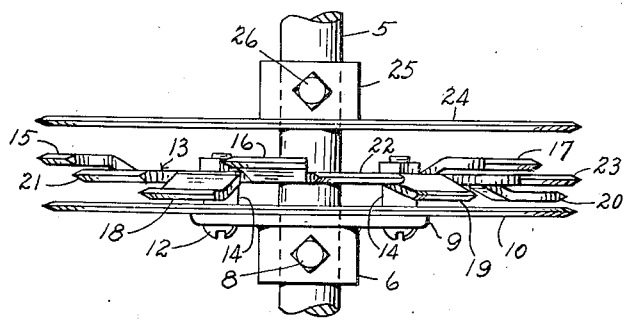
Figure 3 is a plan view of my said embodiment.
Figure 4:
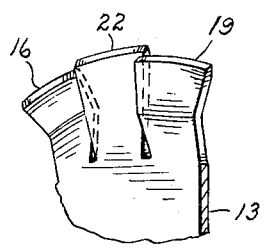
Figure 4 is a broken perspective view of a portion of the toothed edge of a cutting blade.

Referring more in detail to my invention, the reference numeral 5 indicates a shaft which is preferably driven, and may be driven by any suitable means (not shown). A collar 6 is keyed upon the shaft 5, as suggested at 7. A set screw 8 maintains the collar 6 against sliding longitudinally on the shaft 5. The collar 6 is provided with a circular flange 9.

A cutting disc 10 is bolted to the flange 9 by means of bolts 12. A toothed disc 13 is also fastened to the flange 9 and to the cutting disc 10 by means of the bolts 12. Spacing sleeves 14 separate the toothed disc 13 from the cutting disc 10.

The disc 13 has certain of its teeth, 15, 16 and 17, offset to one side of the body of the disc 13, while other teeth 18, 19 and 20, are offset at the other side of the disc 13. The intermediate teeth, 21, 22 and 23, are in the same plane as the body of the disc 13. This arrangement of teeth provides cutting means for a strip adjacent a walk, driveway or the like. The teeth shred and otherwise cut sod adjacent a walk, driveway or the like, into small, easily removable portions.

A second cutting disc 24 is welded to a collar 25, which is held in adjusted positions on the shaft 5 by means of a set screw 26. Figure 1 illustrates a full line and a broken line position of the cutting disc 24 and of the collar 25. It is to be understood that the disc 24 may be any desired distance laterally from the toothed disc 13. The closer the distance of the blade 24 to the toothed disc 13, the narrower will be the strip that is cut away from the side-walk, driveway or the like.

In the operation of my device, while it is preferred to provide motor means to drive the shaft 5, it is to be understood that the motor means may be eliminated for certain uses, if desired.

Rotation of the cutting discs 10 and 24 and the toothed disc 13, effectively cuts the sod along a side-walk, driveway or the like. It is thereafter a simple process to remove the cut portions of the sod. Lateral adjustment of the disc 24 determines the width of the strip cut.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. An edging tool comprising cutting discs spaced laterally from each other, at least one of the discs having teeth around the periphery thereof, at least one of said teeth being offset with respect to, and in parallel relation with, the body of the disc and disposed in the space between the discs.

2. An edging tool comprising cutting discs spaced laterally from each other, at least one of the discs having teeth around the periphery thereof, at least certain of said teeth being offset at opposite sides of the body of the toothed disc.

3. An edging tool comprising cutting discs spaced laterally from each other, at least one of the discs having a series of radially separate teeth around the periphery thereof, certain of the teeth of the series being in the plane of the body of the toothed disc, and certain of said teeth being bodily offset with respect to the body of such disc, the cutting edges of such offset teeth being parallel with, and entirely out of the plane of, the body of the disc.

4. An edging tool comprising cutting discs spaced laterally from each other, a toothed disc between such cutting discs, the toothed disc having at least one of its teeth offset with respect to, and parallel relation with, the body of the disc.

5. An edging tool comprising cutting discs spaced laterally from each other, a toothed disc between such discs, the toothed disc having teeth offset at opposite sides of the body thereof and disposed between the plane of the body of the toothed disc and the first mentioned cutting discs, and the toothed disc having teeth substantially in the plane of the body thereof.

6. An edging tool comprising a shaft, a cutting disc mounted on the shaft, a toothed disc mounted on the first-mentioned cutting disc in spaced relation thereto, at least one of the teeth of the toothed disc being laterally offset with respect to the body of the disc and disposed in the space between the discs in parallel spaced relation to both discs.

7. An edging tool comprising a shaft, spaced cutting discs on the shaft, one of the discs being fixed to rotate with the shaft, a toothed disc mounted upon one of the first-mentioned cutting discs in the space between said cutting discs, at least one of the teeth of the toothed disc having its cutting edge disposed beyond the plane of the body of the disc and disposed in the space between the body of the toothed disc and one of said first-mentioned cutting discs, the cutting disc not carrying the toothed disc being movable along the shaft toward and from the toothed disc, and releasable means maintaining the movable disc in desired positions along the shaft.

8. An edging tool comprising a shaft, flat cutting discs spaced from each other along the shaft, one of the discs being fixed to rotate with the shaft, a flat-bodied disc having staggered teeth around its periphery, the latter disc being mounted upon one of the first-mentioned discs in the space between said cutting discs, cutting edges of the teeth being disposed respectively in the spaces between the plane of the body of the toothed disc and the first-mentioned discs, the cutting disc not carrying the toothed disc being movable along the shaft toward and from the toothed disc, and releasable means maintaining the movable disc in desired positions along the shaft.

9. A cutter for an edging tool, consisting of a cutting disc having a divided peripheral cutting edge portion, forming a series of circumferentially extending cutting edges therearound, certain of said edges being in offset, parallel relation to other edges of the series.

10. A cutter for an edging tool, consisting of a cutting disc having a divided peripheral cutting edge portion, forming a series of circumferentially extending cutting edges therearound, certain of said edges being in offset, parallel relation to other edges of the series at relatively opposite sides of the body plane of the disc.

JOE MAGA.